US011189964B2

(12) United States Patent
Ragaine et al.

(10) Patent No.: US 11,189,964 B2
(45) Date of Patent: Nov. 30, 2021

(54) LOAD-BEARING CONNECTOR CONNECTION

(71) Applicant: SOURIAU, Versailles (FR)

(72) Inventors: Martin Ragaine, Change (FR);
Thierry Gaumer, Souligné sous Ballon (FR)

(73) Assignee: SOURIAU, Versailles (FR)

( * ) Notice: Subject to any disclaimer, the term of this patent is extended or adjusted under 35 U.S.C. 154(b) by 0 days.

(21) Appl. No.: 16/988,669

(22) Filed: Aug. 9, 2020

(65) Prior Publication Data

US 2021/0050689 A1    Feb. 18, 2021

(30) Foreign Application Priority Data

Aug. 14, 2019  (FR) ..................... 19 09218

(51) Int. Cl.
| H01R 13/58 | (2006.01) |
| H01R 13/52 | (2006.01) |
| H01R 13/59 | (2006.01) |

(52) U.S. Cl.
CPC ....... *H01R 13/582* (2013.01); *H01R 13/5205* (2013.01); *H01R 13/59* (2013.01)

(58) Field of Classification Search
None
See application file for complete search history.

(56) References Cited

U.S. PATENT DOCUMENTS

| 5,167,533 A | 12/1992 | Rauwolf |
| 6,918,788 B2 * | 7/2005 | Cavanaugh ........ H01R 13/5205 439/587 |

FOREIGN PATENT DOCUMENTS

WO    2004/054040 A1    6/2004

* cited by examiner

*Primary Examiner* — Ross N Gushi
(74) *Attorney, Agent, or Firm* — Im IP Law; Chai Im; C. Andrew Im

(57) ABSTRACT

A load-bearing connector connection includes two half-flanges encapsulated in a coupling body extending from a first end to a second end. The two assembled half-flanges cover the end of a cable having a plurality of plugs and a helical armor. The two half-flanges include on the inner face thereof a part of the threading engaging with the threading of the helical armor. A locking ring is positioned at the level of a plug housing adjacent to the first end of the coupling body. The coupling body is screwed to the plug housing. The second end of the coupling body is adjacent to a coupling nut. The coupling nut traverses the cable and is assembled with the coupling body by screwing.

3 Claims, 4 Drawing Sheets

LOAD-BEARING CONNECTOR CONNECTION

RELATED APPLICATIONS

This application claims priority from French Patent Application No. 19 09218 filed Aug. 14, 2019, which is incorporated herein by reference in its entirety.

FIELD OF THE INVENTION

The present invention relates to cable connection to a branch box by means of a connector. It is applicable, in particular, to the field of electrical installations in buildings.

BACKGROUND OF THE INVENTION

Existing solutions are based on the use of a cable gland to be attached to the branch box and to be connected to the cable, which involves a time-consuming and difficult implementation. This is only possible in situ in the environment of a building under construction since it is particularly necessary to open the branch boxes.

The need is to create a mechanical, electrical, and leak-tight connection to secure the cable with several electric conductors more readily and more quickly to a branch box when carrying out the electrical installation of a building without having to open the branch boxes.

By way of expected performances, a high tensile strength (>450 N for 5 min as per the UL514B standard) between the cable and the branch box and tightness to dust and water (level >IP65 as per the IEC60529 standard) are required. Furthermore, AC/MC/MCJ cables have the specificity of having an external metallic armor of helical profile. In the case of MC/MCJ cables, this profile is non-symmetrical.

The types of cables to be connected, essentially in the United States, are as follows:
  AC type: type of cable including a metallic armor for protection and electrical continuity around the electric wires. AC is the acronym of "Armored Clad".
  ACJ type: type of cable including a metallic armor for protection and electrical continuity around the electric wires, the whole jacketed with an insulating cladding. ACJ is the acronym of "Armored Clad Jacketed".
  MC type: type of cable including a metallic armor for protection around the electric wires. AC is the acronym of "Metal-Clad".
  MCJ type: type of cable including a metallic armor for protection around the electric wires, the whole jacketed with an insulating cladding. MCJ is the acronym of "Metal-Clad Jacketed".

Existing cable glands are not suitable for use as connector couplings. Indeed, when they are inserted onto the cable, the cladding cutting surfaces axially block the cable gland, rendering the wiring of the connector impossible. It is therefore necessary to have a cable gland or coupling that can be traversed completely by the cable. It should not degrade the outer cladding thereof, so as not to compromise the tightness of the final assembly.

During wiring, a further need is that of dimensionally controlling the axial position of the cuts of the cable with respect to the connector to ensure tightness.

OBJECT AND SUMMARY OF THE INVENTION

The aim of the present invention is that of remedying these drawbacks with a completely innovative approach.

To this end, the present invention relates to a load-bearing connector connection, remarkable in that it comprises two half-flanges encapsulated in a coupling body extending from a first end to a second end, the two assembled half-flanges cover the end of a cable consisting of a plurality of plugs and a helical armor, the two half-flanges include on the inner face thereof a part of the threading engaging with the threading of the helical armor, the plurality of plugs nesting in an insulating insert contained in a plug housing, a locking ring is positioned at the level of the plug housing adjacent to a first end of the coupling body, the coupling body is screwed to the plug housing, the second end of the coupling body is adjacent to a coupling nut, the coupling nut traverses the cable and is assembled with the body by screwing.

Thanks to these arrangements, any person seeking to perform a connection on these AC/MC/MCJ cables, with or without tightness can use this solution.

The advantages are:
  no tools to install these flanges, manual screwing of the coupling being sufficient;
  easier and quicker to use than a flange version requiring screw tightening;
  the half-flanges guarantee a controlled axial position of the cable with respect to the connector;
  the mechanical retention distributed around the cable armor limits the deformation thereof and therefore the external shell retains a cylindrical shape compatible with a tightness solution;
  very high retention on AC/MC/MCJ cable combined if required with tightness (case of MCJ cable);
  the retention is valid in both cable winding directions (as a reminder: the outer profile of the armor of the MC/MCJ cable is non-symmetrical);
  the more the cable is pulled, the better the retention; and
  the cable is kept centered in the coupling facilitating tightness and the position of the wires in the connector.

The invention is advantageously executed according to the embodiments and the alternative embodiments disclosed hereinafter, which are to be considered individually or according to any technically effective combination.

In an embodiment, the cable is jacketed with an insulating cladding.

In an embodiment, the two encapsulated half-flanges include a notch. The notch enables the insertion of a screwdriver to assist with the disassembly of this assembly.

In an embodiment, each half-flange includes at least one centering element located on an assembly surface of each half-flange.

In an example, the centering element is a lug engaging with a hole. In a further example, the centering element is located on one of the half-flanges and corresponds to one lug or two lugs and on the other half-flange the centering element is one hole or two holes. In a further example, each half-flange includes both lug and a hole.

The assembly surface is the cross-section of a flange. Thus, each half-flange includes a section wherein the surface is planar for the assembly with the other half-flange.

In an embodiment, a sealing ring is positioned between the coupling nut and the cable, the sealing ring is housed in a cable gland positioned at the level of the second end of the coupling body.

In an embodiment, the outer surface of the two half-flanges includes ribs. Thus, the ribs limit the use of thermoplastic material.

In an embodiment, there is a radial gap and an axial gap between the two assembled half-flanges and the body of the coupling.

The radial gap and the axial gap being suitable for preventing the rotation during screwing of the body of the coupling on the plug housing while enabling facilitating mounting.

BRIEF DESCRIPTION OF THE DRAWINGS

Further advantages, aims and features of the present invention emerge from the following description given, for the purpose of explanation and not restriction, with reference to the appended drawings, wherein.

DETAILED DESCRIPTION OF THE EMBODIMENTS

Figure 1:
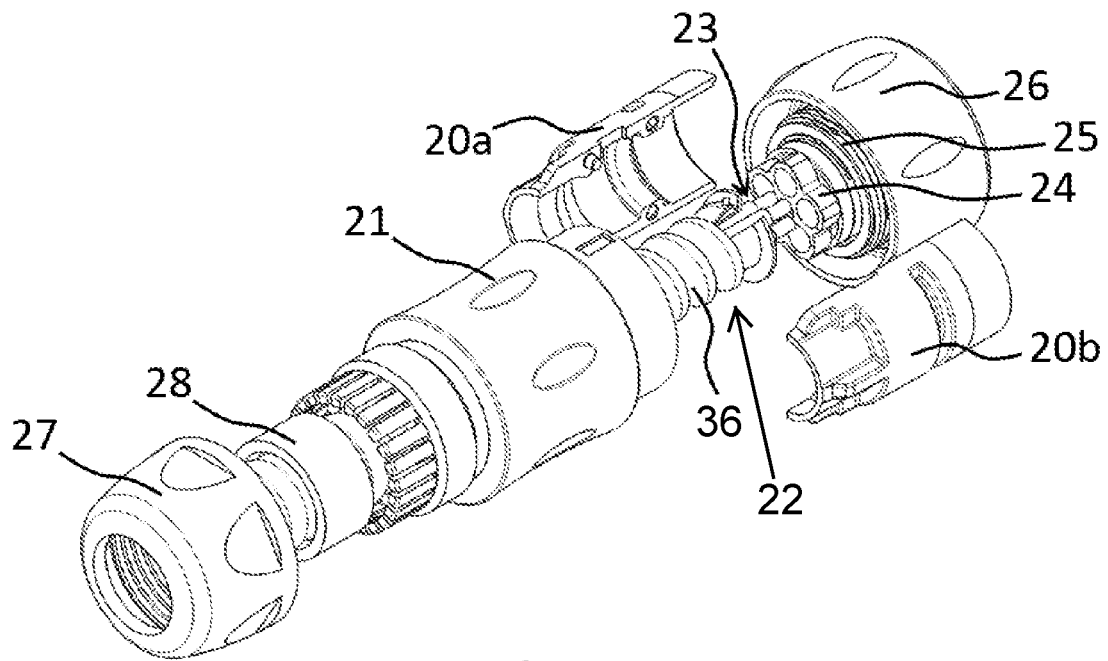
FIG. 1 represents an exploded diagram of the connector connection according to the present invention.

FIG. 1 represents an exploded view of the connector connection.

The solution proposed is a system using two half-flanges, 20a and 20b, encapsulated in a coupling secured with the rear of the connector connection and the end of a cable 22. The cable 22 includes a plurality of plugs 23.

The plurality of plugs 23 is nested in an insulating insert 24 contained in a plug housing 25.

These half-flanges have on one end a compatible interface of the connector grouping together the insert and the housing, and on the other end a tapered outer shape positioned facing an ad hoc counterpart located in the coupling body 21. The outer shapes of the tapered part are ribs limiting the use of thermoplastic material. The total length of the flanges does not exceed the length available between the coupling and the connector grouping together the insert and the housing.

The assembly of the half-flanges provides a rectangular notch which enables the insertion of a screwdriver to assist with the disassembly of this assembly.

The interior or the inner surface of each half-flange includes:
- on one side a compatible cylindrical zone of the connector such that the two half-flanges, 20a and 20b, are inserted into the body of the coupling,
- an intermediate zone disposed in a transverse cross-section of a flange including centering elements corresponding to pieces or holes, and
- a third zone: a threading portion.

The threaded section is sized specially to be cable of being housed on one of the ends of a cable 22 in the hollow of the screw thread of the armor 36 of this cable 22 regardless of the end/winding direction in question.

This screw thread portion of each half-flange ensures mechanical retention. The pieces and holes are sized to interlock and are disposed symmetrically to ensure a mounting and an alignment of the half-flanges on one another.

During the wiring, these half-flanges are easily positioned on each side of the cable 22 to the rear of the connector connection.

In an example, the half-flanges are kept joined together thanks to the combination of pieces force-fitted into holes. In an alternative embodiment, a clip-on tab solution can be also be envisaged instead.

Then the body of the coupling is mounted around and secured to the rear of the connector connection using a threading and an axial stop.

During this operation, it does not rotate the half-flanges thanks to a small radial and axial gap. Once fastened together, any opening movement and axial displacement of the half-flanges is blocked and consequently any relative axial movement of the cable 22 with respect to the connector.

In an embodiment example and also to address the need for tightness, the rear of this coupling also incorporates a conventional cable gland system which during the fastening thereof compresses a sealing ring 28 onto the outer cladding 22A of the cable 22 to guarantee this performance.

If a tensile force is exerted on the cable 22, then the armor 36 thereof transmits the force to the half-flanges. Through the contact of the tapered surfaces, these half-flanges are kept clamped together and therefore on the armor 36. Thus, the force is entirely transmitted to the connector connection.

In an example, the parts forming the connector connection are obtained by thermoplastic injection.

In an example, the half-flanges are also obtained by thermoplastic injection. The specific shapes thereof mean that they are injectable into molds with single closing movement.

Figure 2:
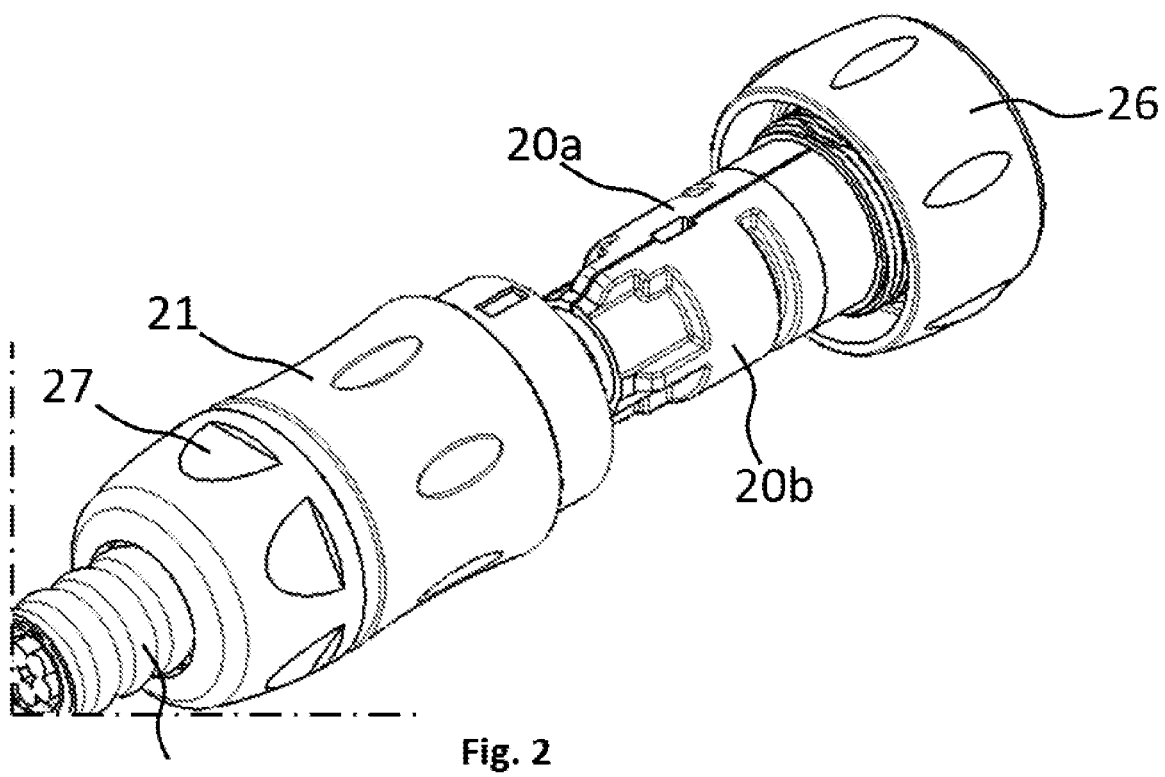
FIG. 2 represents an exploded diagram according to a further step of mounting the connector connection according to the present invention.

FIG. 2 represents an exploded view according to a further step of mounting the connector connection; In FIG. 2, the two half-flanges, 20a and 20b, assembled between the coupling body and the locking ring 26 can be seen.

Figure 3:
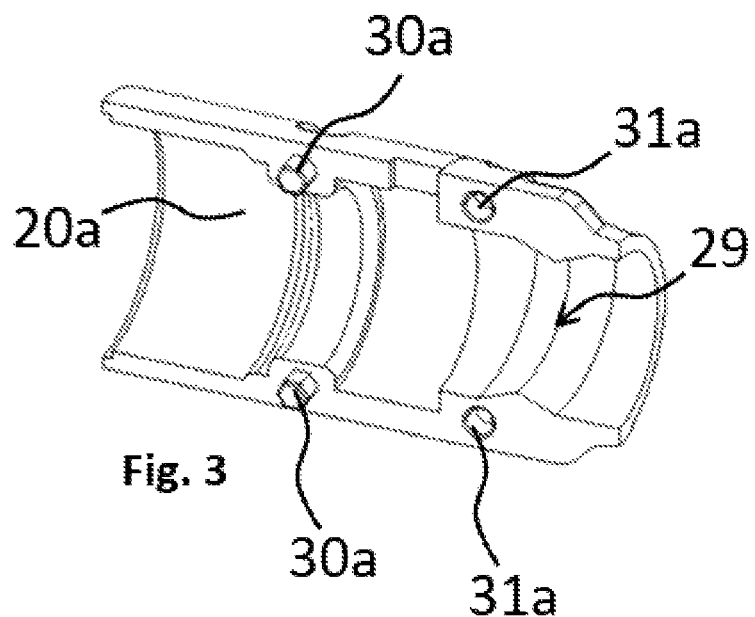
FIG. 3 represents a perspective view of one of the two half-flanges according to the present invention.

FIG. 3 represents a perspective view of one of the two half-flanges, 20a. Inside, a part of the threading 29 engaging with the armor 36 of the cable 22 can be seen.

Each half-flange includes a centering element which is a hole or a piece or both.

In this half-flange 20a, two assembly pieces 30a can be seen. The assembly pieces 30a go beyond the transversal cutting plane (assembly surface) of the half-flange 20a. The assembly pieces 30a are positioned substantially at the center and on each side of the half-flange 20a (top and bottom). The pieces 30a engage with holes 31b of the other half-flange, 20b. Holes 31a are positioned substantially at the level of the part of the threading 29. The holes 31a are positioned in the material of the half-flange 20a.

Figure 4:
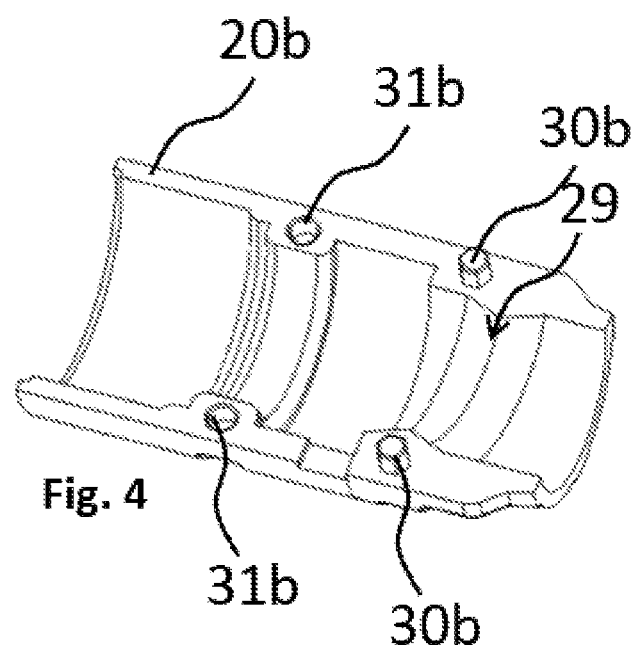
FIG. 4 represents a perspective view of the other of the two half-flanges according to the present invention.

FIG. 4 represents a perspective view of the other of the two half-flanges, 20b. Inside, a part of the threading 29 engaging with the armor 36 of the cable 22 can also be seen.

In this half-flange 20b, two assembly pieces 30b can be seen. The assembly pieces 30b go beyond the transversal cutting plane of the half-flange 20b. The assembly pieces 30b are positioned substantially at the level of the part of the threading 29. The assembly pieces 30b engage with holes 31a of the other half-flange, 20a. Holes 31b are positioned substantially at the center and on each side of the half-flange 20a (top and bottom). The holes 31b are positioned in the material of the half-flange 20b.

Figure 5:
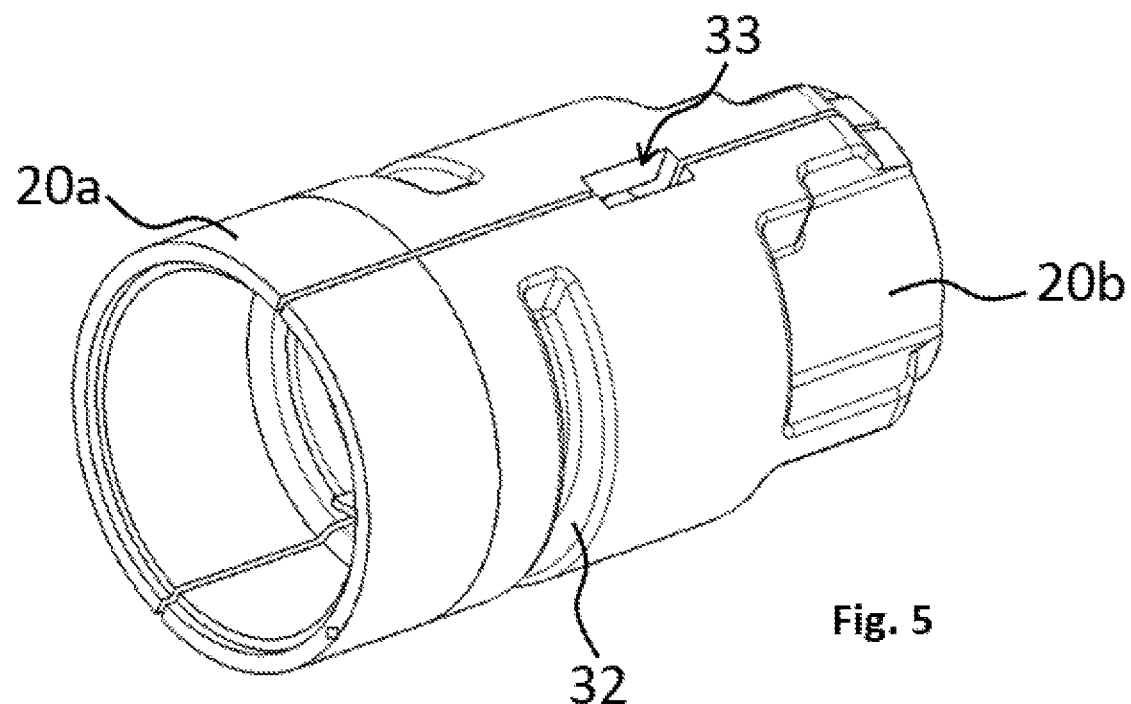
FIG. 5 represents a perspective view of one side of the two assembled half-flanges according to the present invention.

FIG. 5 represents a perspective view of one side of the two assembled half-flanges, 20a and 20b. It can be seen on the outer surface of the ribs on each half-flange. The rib is circular and is in part on the perimeter of each half-flange 20a, 20b. The rib makes it possible to have less material to reduce the weight and production cost.

In FIG. 5, a notch 33 is also shown enabling the passage of a screwdriver tip to facilitate the disassembly of the assembly of the two half-flanges. The notch 33 is divided into two parts located on each half-flange 20a and 20b.

A groove 32 can also be seen. This groove 32 enables a removal of material for a lowering of costs by means of a reduction in the quantity of material required and by means of an accelerated thermal cycle of the molding phase. The groove 32 is close clearance and rounded at the bottom part thereof.

Figure 6:
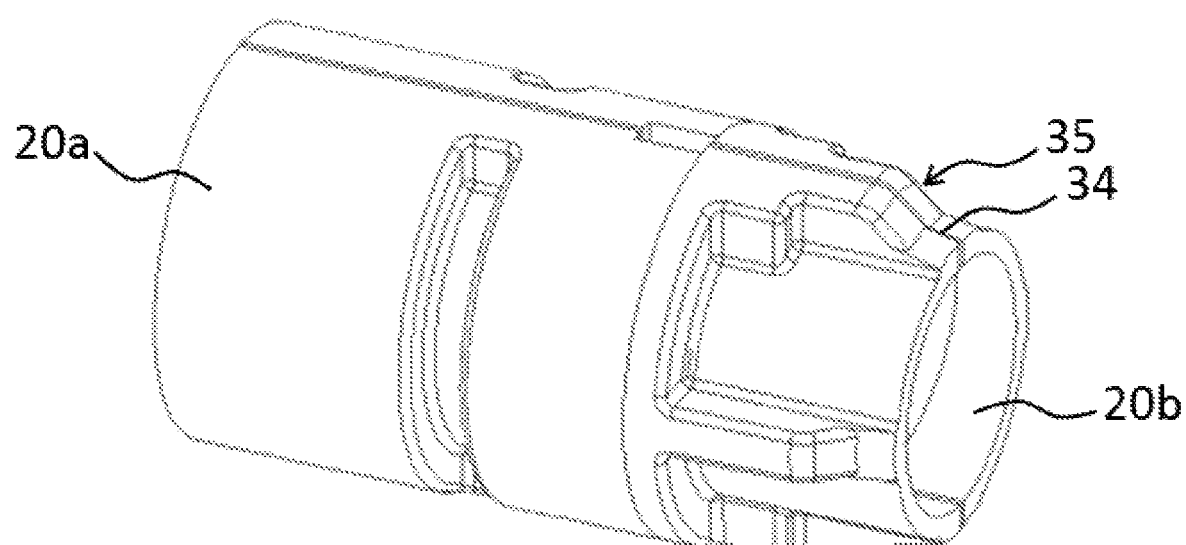
FIG. 6 represents a perspective view of another side of the two assembled half-flanges according to the present invention.

FIG. 6 shows a perspective view of the other side of the two assembled half-flanges 20a and 20b. A local gap 34 can also be seen. It makes it possible to facilitate the assembly and disassembly of the two half-flanges 20a and 20b.

FIG. 6 also shows that a tapered part 35 is found on each half-flange. The tapered part is like a rib, i.e., a protruding part diminishing toward one end. The oblique surface of about 45° includes a rounding. In this example, three tapered parts 35 are found on each half-flange.

Between two conical parts 35, there is a reduction of material for a lowering of costs by means of a reduction in the quantity of material required and by means of an accelerated thermal cycle of the molding phase.

Figure 7:
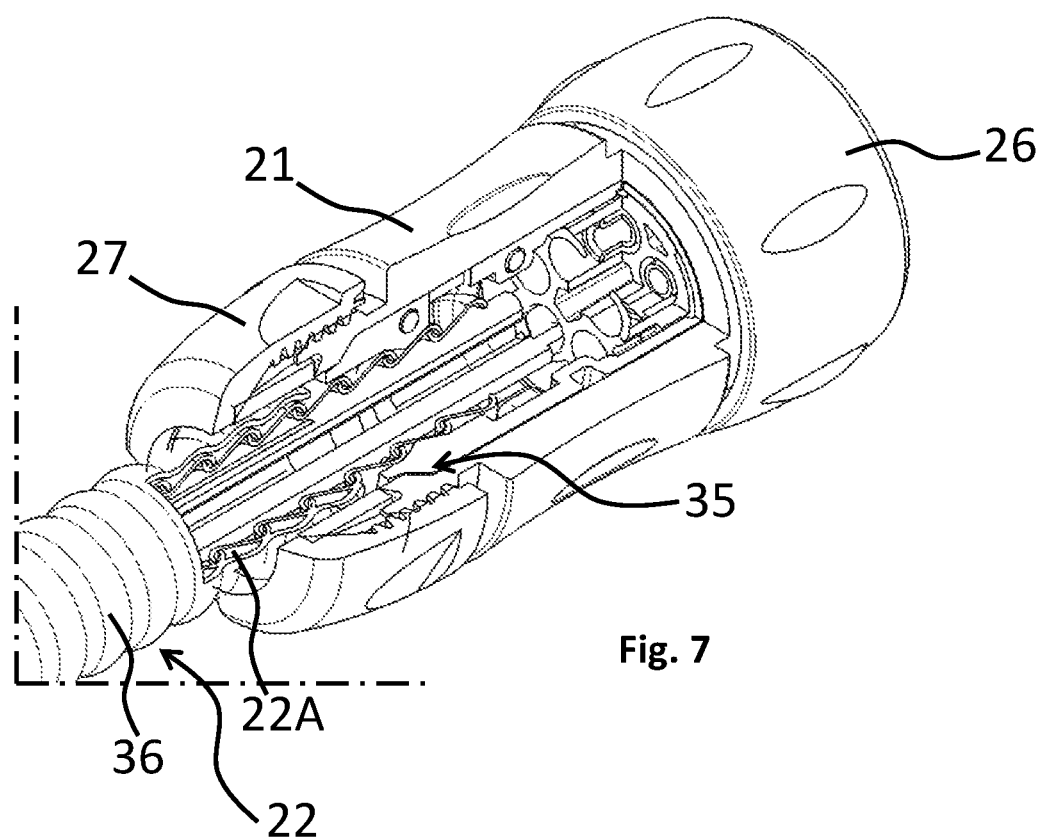
FIG. 7 represents an assembled diagram with a three-quarter section of the connector connection according to the present invention.

FIG. 7 represents an assembled diagram with an open three-quarter section of the connector connection wherein some of the elements mentioned above can be seen, such as the armor 36 and insulating cladding 22A of the cable 22.

The tapered part 35 engages with tapered shapes inside the coupling body 21, which facilitates assembly.

TABLE 1

List of reference signs:

| References | Descriptions |
| --- | --- |
| 20a and 20b | two half-flanges |
| 21 | Coupling body |
| 22 | cable |
| 23 | plug |
| 24 | insulating insert |
| 25 | plug housing |
| 26 | locking ring |
| 27 | coupling nut |
| 28 | sealing ring |
| 29 | threading part |
| 30a, 30b | assembly pieces |
| 31a, 31b | assembly holes |
| 32 | groove |
| 33 | notch |
| 34 | local gap |
| 35 | tapered part |

The invention claimed is:

1. A load-bearing connector connection, comprising:
two half-flanges encapsulated in a coupling body extending from a first end to a second end, the two half-flanges assembled cover an end of a cable, the cable comprising a plurality of plugs and a helical armor, the two half-flanges comprise on an inner face thereof a part of a threading engaging with a threading of the helical armor;
the plurality of plugs nesting in an insulating insert of a plug housing;
a locking ring positioned at a level of the plug housing adjacent to the first end of the coupling body;
a coupling nut traversing the cable and is adjacent the second end of the coupling body;
a sealing ring positioned between the coupling nut and the cable, the sealing ring is housed in a cable gland positioned at a level of the second end of the coupling body; and
wherein the coupling body is configured to screw on the plug housing and the coupling nut is configured to screw on the coupling body.

2. A load-bearing connector connection, comprising:
two half-flanges encapsulated in a coupling body extending from a first end to a second end, the two half-flanges assembled cover an end of a cable, the cable comprising a plurality of plugs and a helical armor, the two half-flanges comprise on an inner face thereof a part of a threading engaging with a threading of the helical armor;
the plurality of plugs nesting in an insulating insert of a plug housing;
a locking ring positioned at a level of the plug housing adjacent to the first end of the coupling body;
a coupling nut traversing the cable and is adjacent the second end of the coupling body;
wherein the coupling body is configured to screw on the plug housing and the coupling nut is configured to screw on the coupling body; and
wherein an outer surface of each half-flange comprises ribs.

3. A load-bearing connector connection, comprising:
two half-flanges encapsulated in a coupling body extending from a first end to a second end, the two half-flanges assembled cover an end of a cable, the cable comprising a plurality of plugs and a helical armor, the two half-flanges comprise on an inner face thereof a part of a threading engaging with a threading of the helical armor;
the plurality of plugs nesting in an insulating insert of a plug housing;
a locking ring positioned at a level of the plug housing adjacent to the first end of the coupling body;
a coupling nut traversing the cable and is adjacent the second end of the coupling body;
a radial gap and an axial gap between the two half-flanges assembled and the coupling body, the radial gap and the axial gap are configured to prevent a rotation during screwing of the coupling body on the plug housing; and
wherein the coupling body is configured to screw on the plug housing and the coupling nut is configured to screw on the coupling body.

\* \* \* \* \*